United States Patent
Marraffa

(10) Patent No.: US 7,128,219 B2
(45) Date of Patent: Oct. 31, 2006

(54) BATTERY RACK AND SYSTEM

(75) Inventor: Andew Marraffa, Exton, PA (US)

(73) Assignee: Kim Manufacturing Company, Downingtown, PA (US)

( * ) Notice: Subject to any disclaimer, the term of this patent is extended or adjusted under 35 U.S.C. 154(b) by 0 days.

(21) Appl. No.: 11/120,780

(22) Filed: May 3, 2005

(65) Prior Publication Data

US 2005/0259404 A1  Nov. 24, 2005

Related U.S. Application Data

(63) Continuation of application No. 09/989,502, filed on Nov. 20, 2001, now Pat. No. 6,719,150.

(60) Provisional application No. 60/294,444, filed on May 30, 2001.

(51) Int. Cl.
*A47F 7/00* (2006.01)

(52) U.S. Cl. ............... 211/49.1; 211/189; 211/26

(58) Field of Classification Search .......... 211/49.1, 211/189, 26, 182, 134, 187, 191, 190, 192, 211/207, 13.1, 183; 429/96, 99, 66, 130, 429/152, 153; 249/175, 186, 148, 163, 167

See application file for complete search history.

(56) References Cited

U.S. PATENT DOCUMENTS

| | | | | |
|---|---|---|---|---|
| 1,487,856 A | * | 3/1924 | Hauserman et al. | 108/60 |
| 2,577,101 A | * | 12/1951 | Ball et al. | 312/107 |
| 3,272,581 A | * | 9/1966 | Stucki | 312/234.4 |
| 3,541,396 A | * | 11/1970 | Lowry et al. | 361/803 |
| 4,056,295 A | * | 11/1977 | Downing | 312/107 |
| 4,317,497 A | * | 3/1982 | Alt et al. | 180/68.5 |
| 4,501,368 A | * | 2/1985 | Gill | 211/41.17 |
| 4,707,038 A | * | 11/1987 | Voegeli | 312/265.5 |
| 5,245,359 A | * | 9/1993 | Ito et al. | 346/139 R |
| 5,284,254 A | * | 2/1994 | Rinderer | 211/26 |
| 5,295,591 A | * | 3/1994 | Slater | 211/59.2 |
| 5,366,827 A | * | 11/1994 | Belanger et al. | 429/99 |
| 5,441,123 A | * | 8/1995 | Beckley | 180/68.5 |
| 5,590,939 A | * | 1/1997 | Piontek | 312/263 |
| 5,644,477 A | * | 7/1997 | Klein | 361/829 |
| 5,867,372 A | * | 2/1999 | Shie | 361/826 |
| 5,890,606 A | * | 4/1999 | Kuipers | 211/186 |
| 5,936,371 A | * | 8/1999 | Bolash et al. | 318/685 |
| 5,981,101 A | * | 11/1999 | Stone | 429/100 |
| 6,120,934 A | * | 9/2000 | Linning et al. | 429/175 |
| 6,126,022 A | * | 10/2000 | Merkel | 211/135 |
| 6,162,559 A | * | 12/2000 | Vutetakis et al. | 429/100 |

(Continued)

OTHER PUBLICATIONS

Douglas Battery Manufacturing Co., DSV Cell/Cell Jacket dated Mar. 19, 2001.

*Primary Examiner*—Jennifer E. Novosad
(74) *Attorney, Agent, or Firm*—Eugene E. Renz, Jr.

(57) ABSTRACT

A frame device for supporting objects such as batteries during seismic stress, comprising a pair of end frame members mounted in upstanding spaced apart relation by a plurality of vertically spaced elongated channel support members secured at opposite terminal ends to the vertical columns of the end frame members, shelves for supporting batteries spanning the channel support members and defining a plurality of compartments for the batteries, each end frame member being formed of a single sheet material shaped to define vertical columns and a web extending between the end columns, a pair of anchors, elements for securing the end frames to the anchors, and elements defining a plurality of openings in the web of each end frame generally aligned with the compartments formed by the shelves to provide horizontal ventilation of batteries mounted in the compartments.

5 Claims, 14 Drawing Sheets

U.S. PATENT DOCUMENTS

| | | | |
|---|---|---|---|
| 6,279,756 B1 * | 8/2001 | Walter et al. | 211/26 |
| 6,310,783 B1 * | 10/2001 | Winch et al. | 361/797 |
| 6,370,022 B1 * | 4/2002 | Hooper et al. | 361/685 |
| 6,451,475 B1 * | 9/2002 | Sherwood | 429/100 |
| 6,466,449 B1 * | 10/2002 | Sheen et al. | 361/752 |
| 6,475,659 B1 * | 11/2002 | Heimer | 429/66 |
| 6,478,166 B1 * | 11/2002 | Hung | 211/26 |
| 6,482,541 B1 * | 11/2002 | Bator et al. | 429/100 |

* cited by examiner

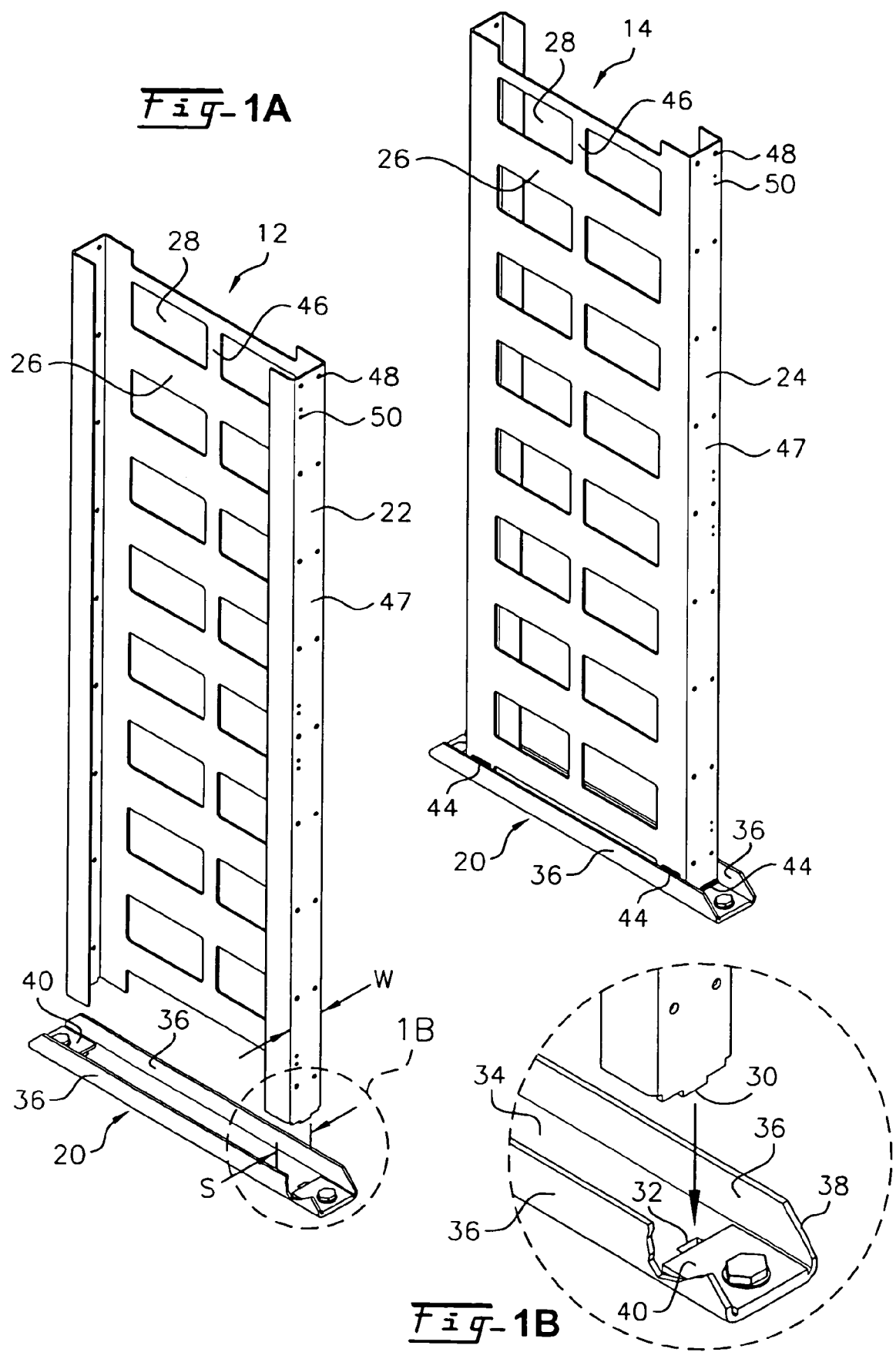

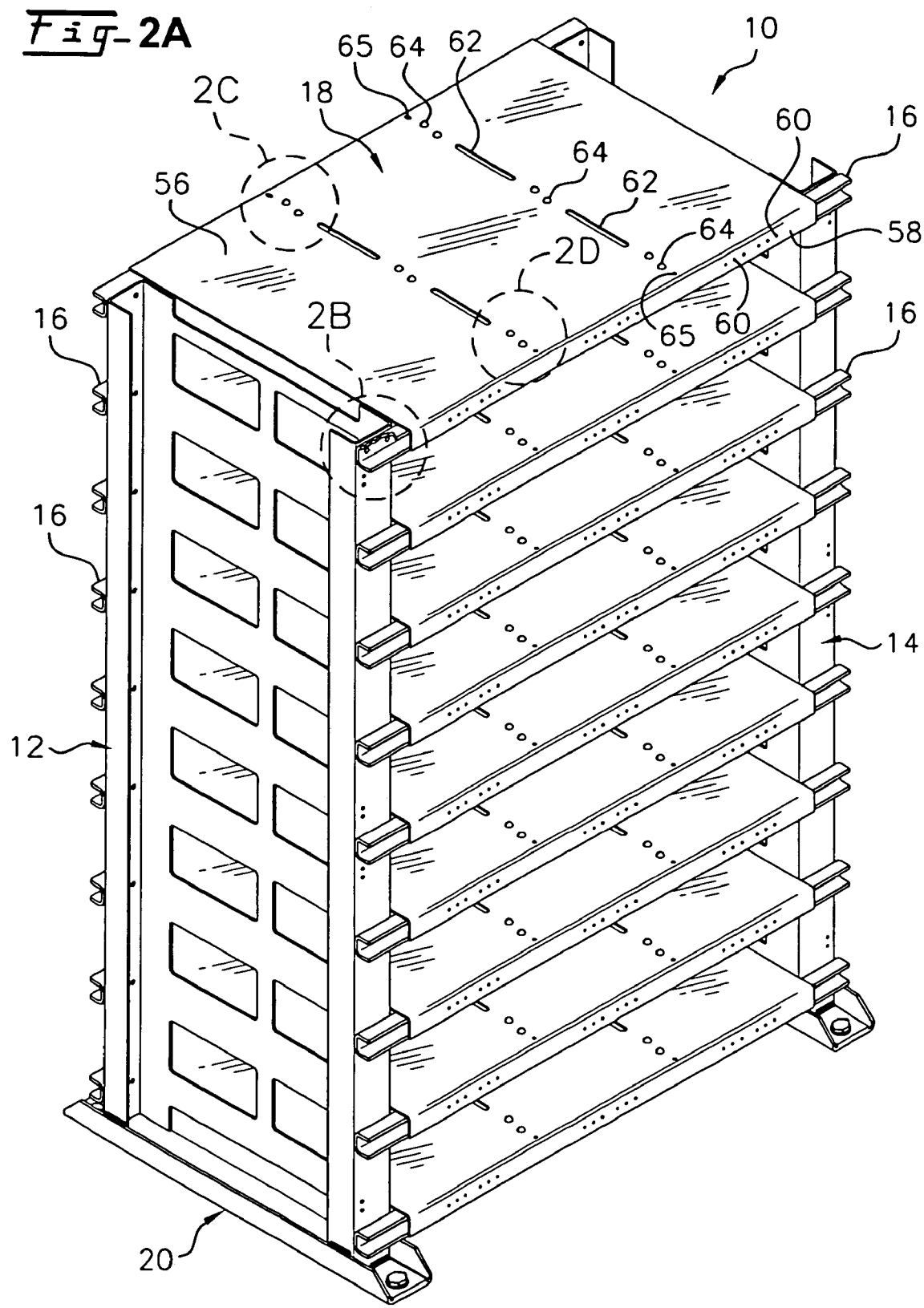

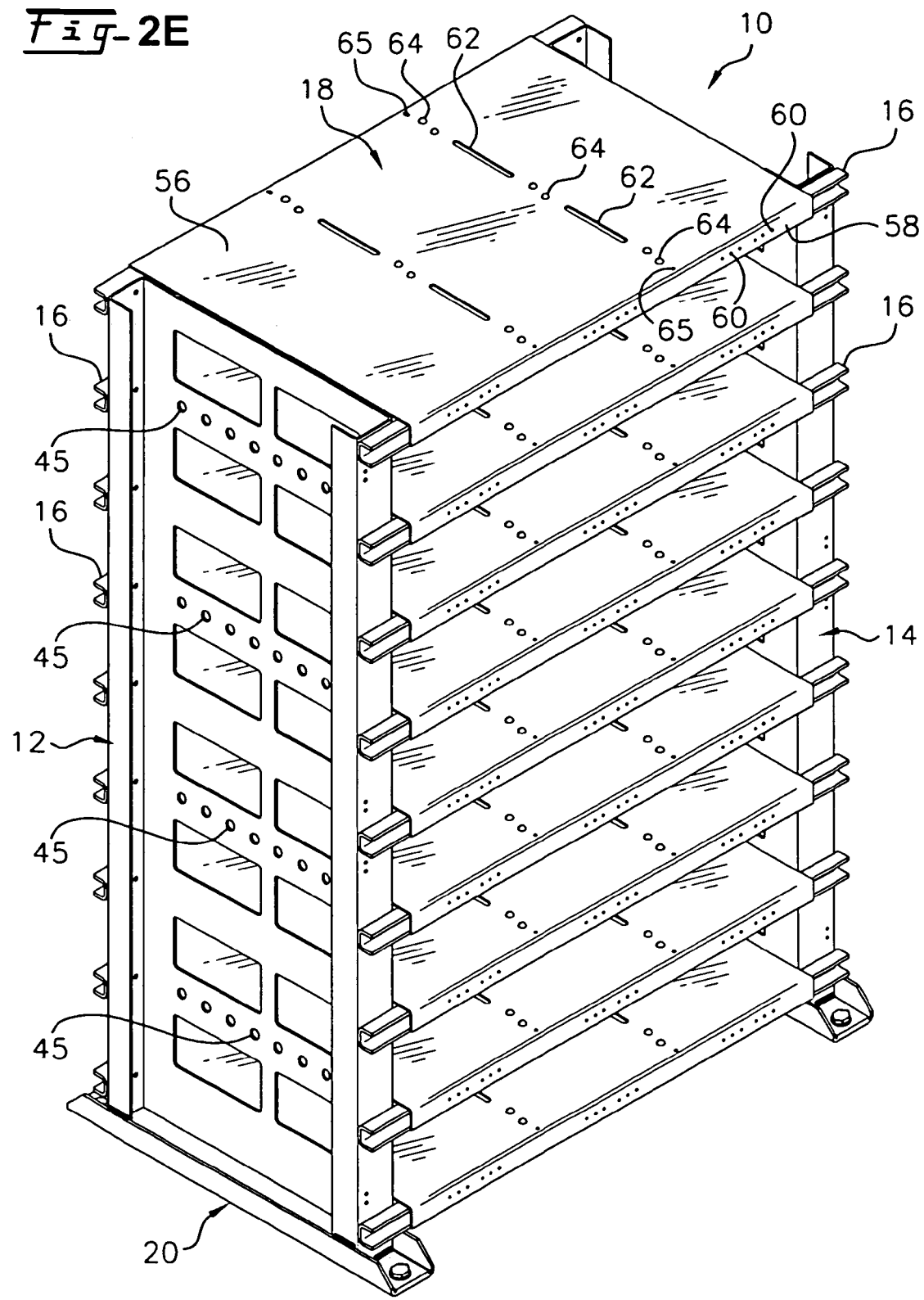

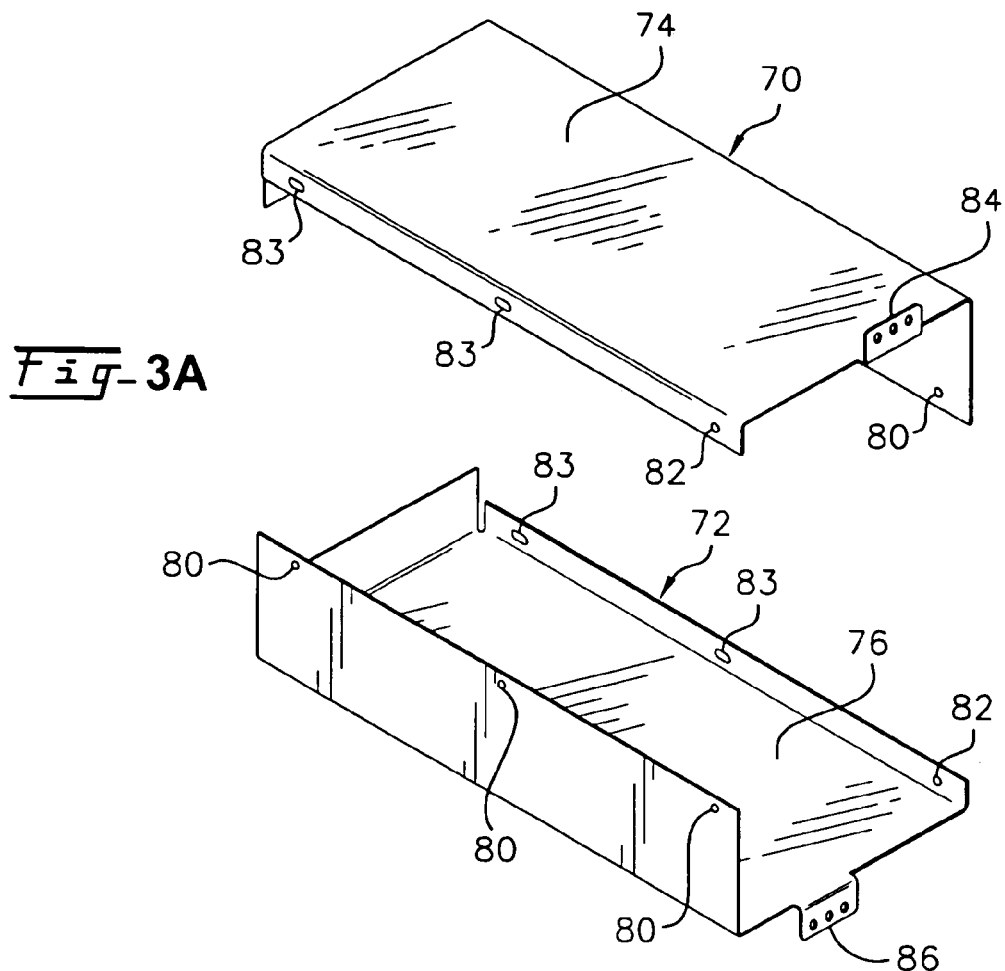
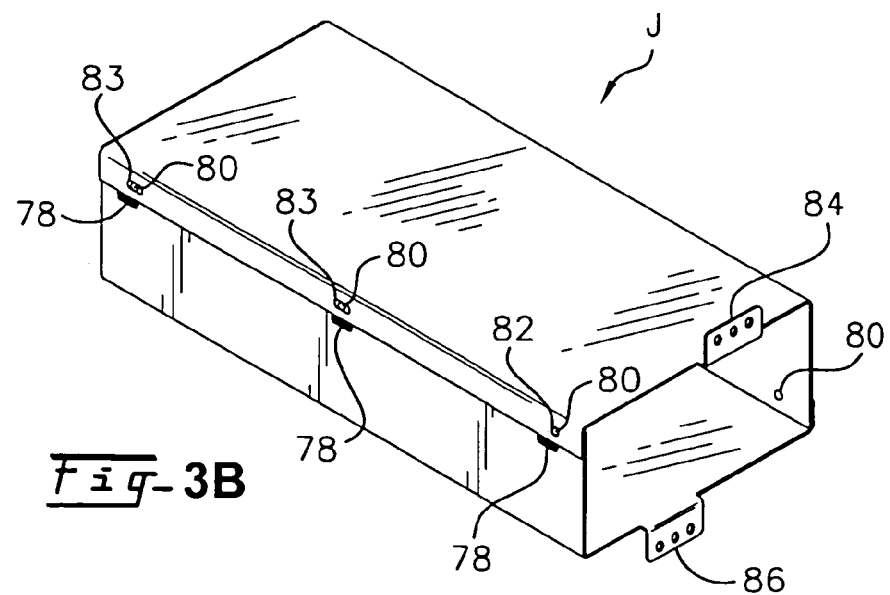

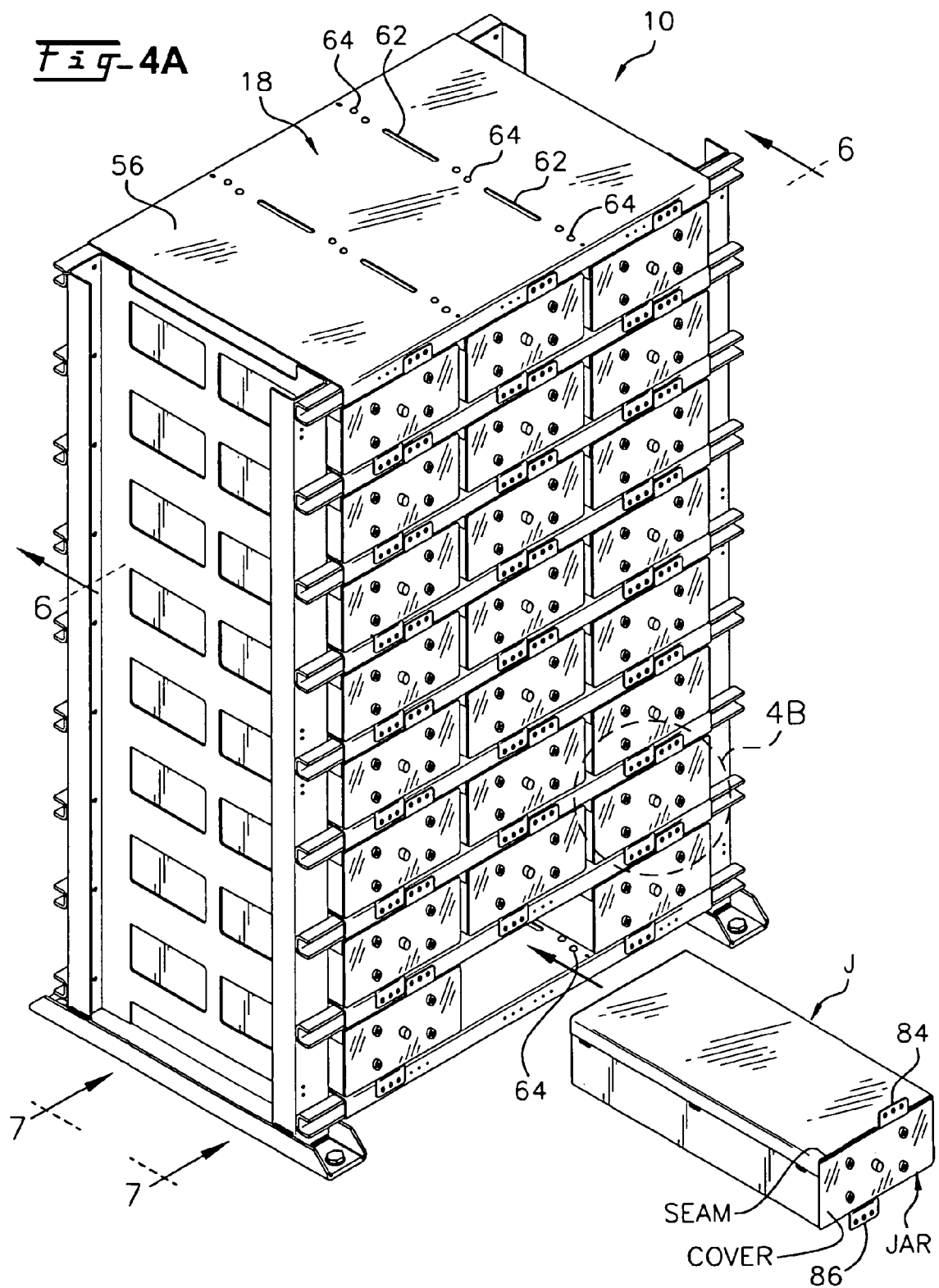

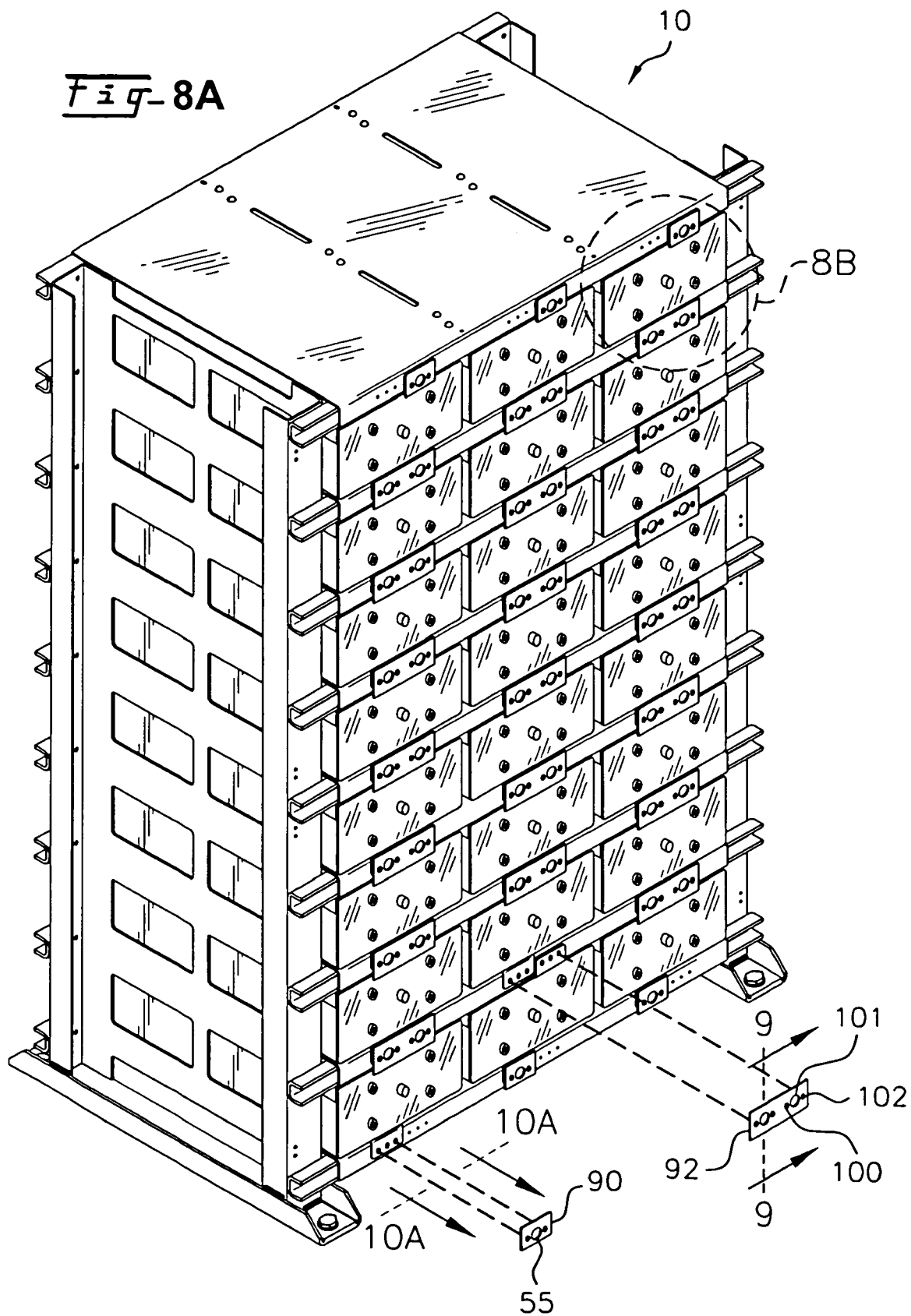

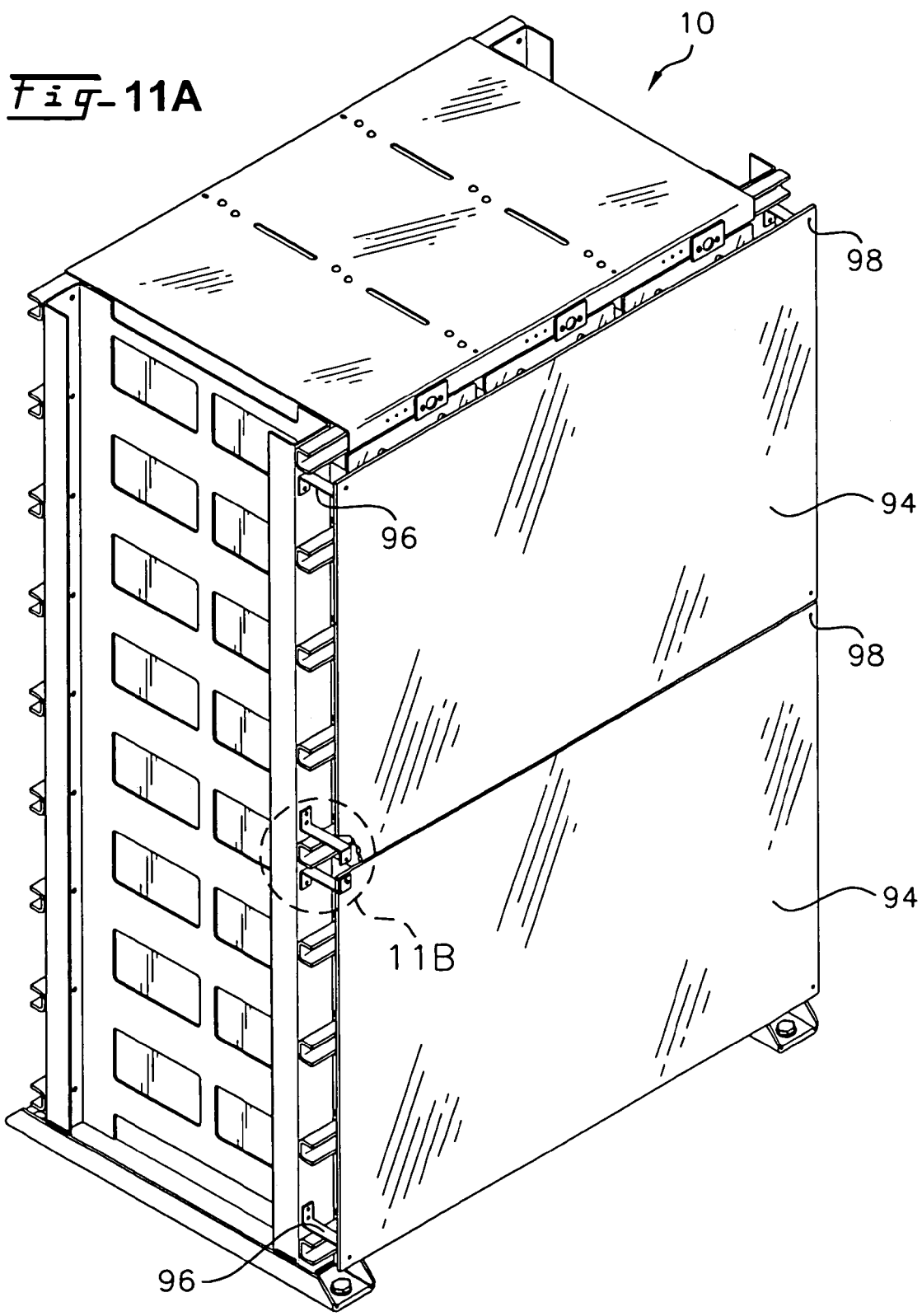

BATTERY RACK AND SYSTEM

This is a continuation of Parent application Ser. No. 09/989,502 filed on Nov. 20, 2001, now U.S. Pat. No. 6,719,150 and entitled BATTERY RACK AND SYSTEM and claiming the benefit of Provisional Application, Ser. No. 60/294,144 filed May 30, 2001.

FIELD OF THE INVENTION

The present invention relates to a rack for supporting and storing objects and more specifically to a battery rack system and apparatus having a plurality of compartments for supporting batteries and other heavy objects designed to survive seismic forces during earth tremors and the like. The invention relates specifically to frames forming part of what is known as an uninterruptable power source.

BACKGROUND OF THE INVENTION

There is a need, particularly in the telecommunications industries, for a back up power source to maintain operations when the primary power source shuts down. These systems generally comprises a plurality of valve regulated lead acid batteries (VRLA) generally of a two volt size which are typically connected in series in various numbers, for example 24, to provide or define a 18 volt system. These batteries are typically constructed of polypropylene jars which is a relatively soft material similar to milk jugs and a cover mounting the leads connected to the jar by a seam. These jars generally require an exterior shell for protection as well as pressure control. It has been found that without compression, these batteries tend to bulge thereby diminishing capacity.

In accordance with a known prior art system, the batteries are stored or placed in multi-cavity modules or trays which are stacked, one on top of the other and secured to one another to provide an array of assembled trays and batteries totaling the requisite number for a given system such as 24 batteries for a 48 volt system.

An important criteria for systems of this type is that the support structures function to support the heavy loads and be reliable particularly in times of crises. These prior systems have certain disadvantages and draw backs. For example, batteries are installed in the modules at the battery plant or factory. Typically, a three battery module may weigh about 800 lbs. These trays are therefore rather bulky and difficult to handle at the installation site. Further, the module pockets, in some instances, are oversized relative to the battery and require the use of shims to snugly position the batteries in the module pockets. The batteries are typically placed in the modules before the final charge creating pressure between the battery and the module. Accordingly, when the batteries swell, if there is need for the installer to remove the batteries, the batteries are usually gripped by the posts which can cause battery damage. Further, it has been found that the interconnected modules are not always as stable as they should be and do not satisfy the criteria for supporting heavy loads in time of seismic crises.

Summarizing the disadvantages of the presently known systems, it has been that cell damage results by overstressing the post seals when installers handle the batteries by the posts, especially during extraction of cell and lifting thereof.

Other adverse affects of extraction of cells from the modules or trays include exposure of the jars to the ambient environment and potential puncture. Further, extraction can result in jar to cover seam damage during reinsertion of the cell into the modular trays. Further, in some instances, the jars are shimmed in the trays to maintain pressure. These shims are inserted prior to jar bulging and once the jar bulges, it is difficult to extract the cell from the trays and even more difficult to reinsert them. Often the shim is not reused resulting in lose of pressure and thus diminishing capacity.

SUMMARY OF THE INVENTION

The rack assembly and system of the present invention obviates some of the disadvantages and drawbacks of the prior system discussed above. To this end, the rack system of the present invention comprises a frame device for supporting objects such as batteries during seismic stress, comprising a pair of end frame members mounted in upstanding spaced apart relation by a plurality of vertically spaced elongated channel support members secured at opposite terminal ends to the vertical columns of the end frame members, shelves for supporting batteries spanning the channel support members and defining a plurality of compartments for the batteries, each end frame member being formed of a single sheet material shaped to define vertical columns and a web extending between the end columns, a pair of anchors, means securing the end frames to the anchors, and means for defining a plurality of openings in the web of each end frame generally aligned with the compartments formed by the shelves to provide horizontal ventilation of batteries mounted in the compartments.

With the foregoing in mind it is an object of the present invention to provide an improved battery rack system characterized by novel features of construction and arrangement providing certain functional advantages over the prior art systems discussed above.

A further object of the invention is to provide a battery rack systems which essentially consists of only two main structural components and therefore is easy and quick to assemble and install.

Still a further object of the present invention is to provide a rack system including two relatively rigid end frame members configured to define relatively large ventilation ports for horizontal air flow which improves battery performance.

A still further object of the present invention is to provide a rack assembly and system which includes a novel, relatively rigid end frame structure and anchors which are easily accessible for securing the assembly on a concrete floor or the like.

Still another object of the present invention is to provide a rack assembly and system wherein no side or rear access is required for assembly of the rack and the batteries therein and accordingly the rack assembly and system can be used in extremely small spaces. For example, the space required almost as small is the rectangular footprint of the rack assembly.

A still another object of the present invention is to provide a battery rack assembly and systems wherein the frame including a novel configuration of end frame members which are symmetrical and therefore can be manufactured economically and installed easily and which are characterized by a series of ventilation slots and webs between the slots which confront a plurality of open compartments in the rack for the batteries to thereby aid and guide the batteries into the rows defined in the compartments.

Still another object of the present invention is to provide a novel battery rack assembly and system which has great flexibility and only one designed frame is needed for the entire 120-size system product line in a 8-high configuration.

Still a further object of the present invention is to provide a novel battery rack assembly and system wherein the shelves are divided into rows or zones for the batteries defined by a series of spaced dimples and openings spacing the rows of batteries at a predetermined distance from one another to whereby the ventilation slots facilitate vertical air flow over the batteries and with again the result of improving battery performance.

Still another object of the present invention is to provide a novel jacket configuration for the batteries characterized by a unique design allowing for handling the cells individually thereby facilitate handling and wherein the open end configuration is such to protect the joint between the cover and the jar from damage.

Still another object of the present invention is to provide a jacket configuration where the cell need not be extracted from the jacket or handled by its posts and thereby eliminating cell posts seal damage and jar damage as well as diminished capacity due to loss of pressure characteristic of prior art configuration.

A still further object of the present invention is to provide a novel jacket arrangement constructed of two identical pieces which are configured to be easily welded together to form a neat compact jacket for the individual batteries which includes points for picking up and handling the batteries and therefore eliminates cell damage.

BRIEF DESCRIPTION OF THE DRAWINGS

These and other objects of the present invention and various features and details of the construction and operation thereof are hereinafter more fully set forth with reference to the accompanying drawings, wherein:

FIG. 1A is an exploded perspective view of end frames of the rack and the anchor or base channel for supporting the rack system on a support surface such as concrete flooring in a commercial facility;

FIG. 1B is an enlarged view showing tabs or tangs on the feet of the end frame members which engage in slots in the base channel for rigidly supporting the end frames in the anchors or base channels;

FIG. 2A is a perspective view of the battery rack assembly showing the shelf support channels and the shelves for the batteries and jackets assembled to the end frames;

FIG. 2E is a perspective view of a modified embodiment of battery rack including additional horizontal air flow ports;

FIG. 3A is a perspective view of the two components forming the battery jacket;

FIG. 3B is a perspective view of the halves of the jackets welded together;

FIG. 4A is a perspective view of the battery rack assembly showing the jackets and batteries in place in the shelves;

FIG. 8A is a perspective view of the battery rack assembly with the battery retaining bars assembled;

FIG. 11A is a perspective view of the battery rack assembly and a protective shield overlying the cover of the array of batteries housed in jackets.

DETAILED DESCRIPTION OF THE PREFERRED EMBODIMENTS

Figure 2B:
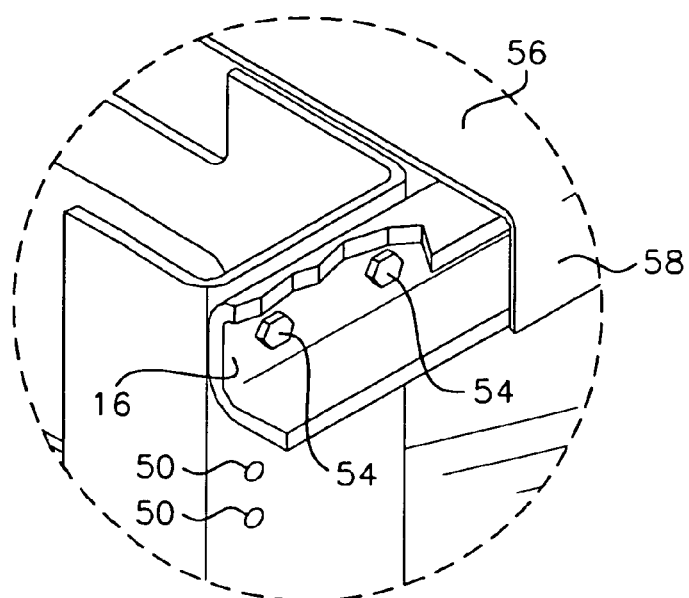
FIG. 2B is an enlarged partially cutaway view showing the bolted joint between a shelf support channel and the end frame.

Referring now to the drawings and particularly to FIG. 2 thereof, there is shown a battery rack assembly and system including the unique features of the present invention which is generally designated by the numeral 10. The battery rack assembly 10 essentially comprises a pair of spaced apart end frames 12 and 14, a series of shelf support channels 16 which connect the end frames 12 and 14 and shelves 18 spanning the support channels which are spaced apart vertically to define a series of compartments for storing batteries in jackets in a manner described in more detail hereafter. The end frames 12 and 14 are rigidly supported in base channels 20) which can be anchored to a support surface such as a concrete floor in a commercial building.

Considering now the components of the battery rack assembly 10 in more detail and with specific reference to the end frames 12 and 14, each end frame may be fabricated from a single sheet of sheet metal punched and formed to the configuration shown in the drawings. Since the end frames 12 and 14 are of identical configuration, like parts thereof will be designated with the same reference numeral. Each end frame as illustrated is of a configuration to define a pair of elongated, vertically extending columns 22 and 24 generally C-shaped connect by a generally rectangular web 26 having, in the present instance, a series of generally rectangular openings 28 arranged in two rows $R_1$ and $R_2$ which facilitates horizontal ventilation of the batteries mounted in the rack assembly to thereby improve battery performance. The foot of each column 24 has a depending tang 30 formed therein adapted to engage in a slot 32 formed in the anchor 20. The anchor 20 as illustrated in FIGS. 1A and 1B is an elongated channel-shaped member of U-shaped cross section having a generally rectangular base 34 and a pair of upstanding side walls 36 which at their outer terminal ends are beveled as at 38. The base 34 of the anchor is reinforced by a pad 40 adjacent the anchor mounting hole 42. The end frame members 12 and 14 are easy to assemble to the anchor 20 by simply inserting the tangs 30 into the slot 32 and welding the parts in place as at 44. Note, the transverse width W of the columns 22 and 24 is essentially the same width as the spacing S between the side walls 36 of the anchor 20 so that the feet of the vertical columns 22 and 24 snugly embrace the side wall 36 when the vertical frame is assembled to the anchor 20. This adds to the rigidity of the rack. Note that the pads and anchor holes 42 project beyond the vertical frame and shelf support channels for easy access.

Figure 5B:
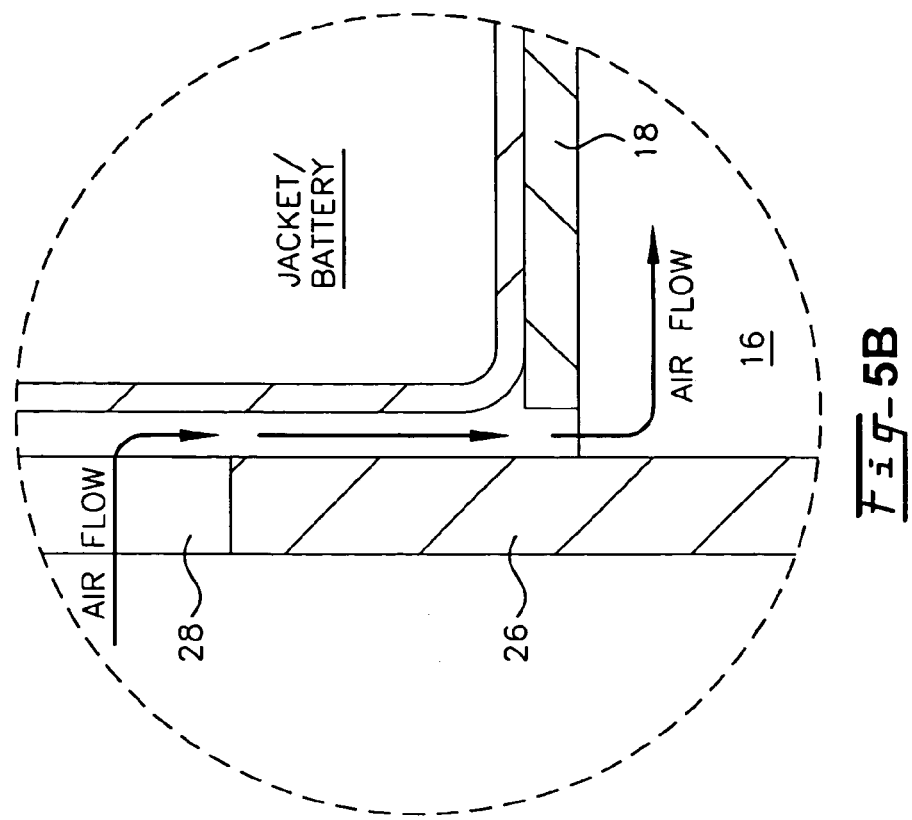
FIGS. 5A and 5B are enlarged views showing air flow around the batteries on the rack.
Figure 5A:
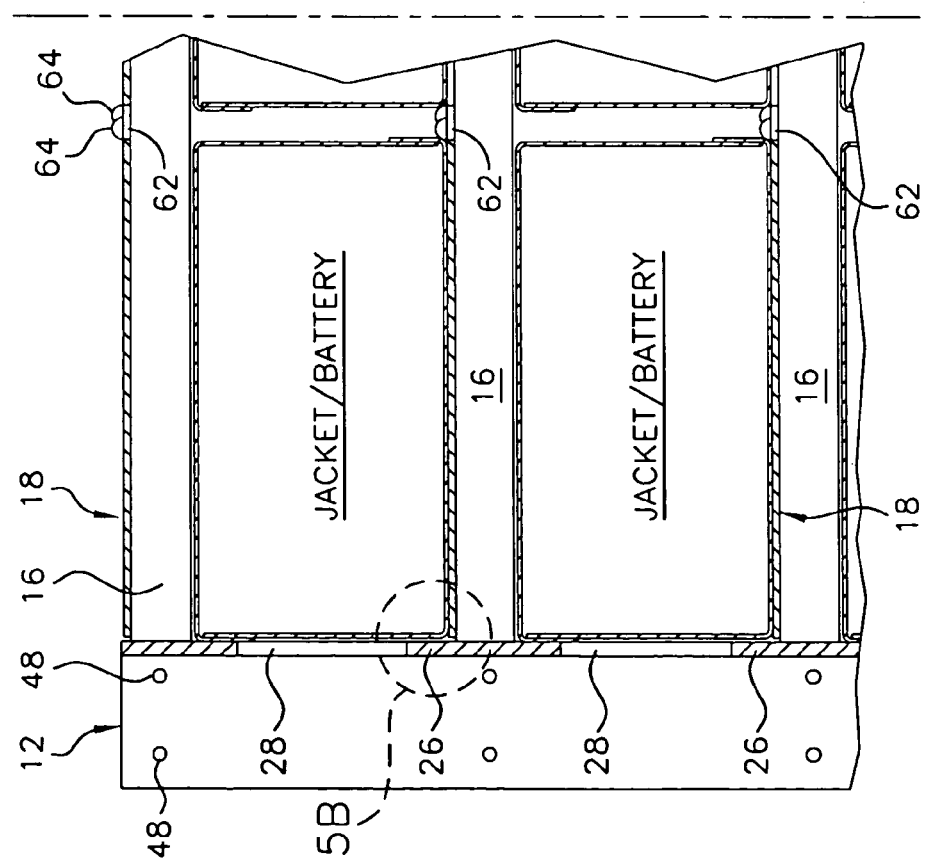

Since there are only two main structural components, the end frame members 12 and 14 provide ease of installation. The ventilation slots 28 produce good generally horizontal air flow for improving battery performance. (See FIGS. 5A and 5B showing air flow.) The webs 46 between the ventilation slots guide the batteries into position for ease of installation of the batteries as explained in more details below. The frame configuration and design provide symmetry so that are no left or right considerations providing ease of installation and manufacture.

There is shown in FIG. 2E a modification of the end frames wherein a series of vent openings 45 are provides in the webs to further enhance cooling air flow to improve batteries performance.

Bolt holes 48, 50 are provided in the vertically extending end faces 47 of columns 22 and 24 of the vertical frame members to attach the shelf support channels 16 and battery shield brackets 96. As illustrated, there are a series of vertically spaced bolt holes 48 arranged in pairs for mounting the shelf support channels 16 and a series of vertically oriented pairs of bolt holes 50 for supporting brackets 96 for the battery shield 94. As illustrated in FIG. 2B, shelf support channels 16 are supported between the end frames 12 and 14 by bolts 54 at opposite terminal ends to provide a rigid support structure when all of the shelf support channels 16 are in place.

Figure 2C:
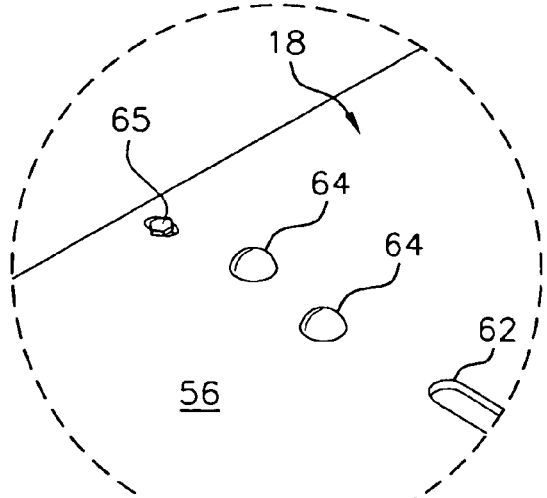
FIG. 2C is an enlarged view of the portion circled in FIG. 2A marked 2C showing the shelf projections defining the zones separating the jackets and vertical air flow channels.
Figure 2D:
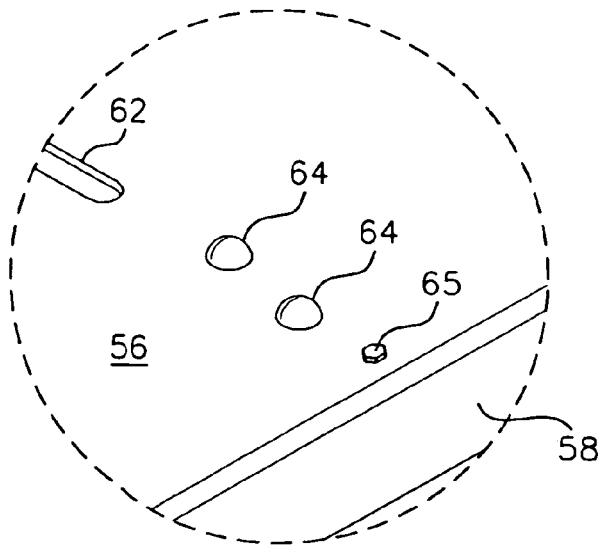
FIG. 2D is an enlarged view of the portion circled in FIG. 2A and marked 2D showing zone divider and air flow channels.

The shelves 18 for the battery rack assembly comprise a generally rectangular support panel section 56 having a depending flange 58 along the front edge thereof which has a series of bolt holes 60. The panel section 56 is divided into three zones $Z_1$, $Z_2$ and $Z_3$ by transversely extending alternating rows of spaced slots 62 and a series of upwardly projecting dimples 64. The slots 62 provide a vertical flow path for further ventilation of the batteries to further enhance battery performance. The dimples space the rows of batteries and jackets to enhance any flow. The shelves 18 are fixed in place by pairs of bolts 65 at each of the bolt hole locations which as illustrated in FIGS. 2C and 2D, engage through the adjacent innermost bolt holes in the shelf and aligned bolt holes in the channel support member 16.

Consider now the battery jacket J which is best illustrated in FIGS. 3A and 3B. The jacket J comprise two parts, top and bottom halves 70 and 72, each formed from a single piece of sheet material to the configuration shown. As illustrated, the two parts 70 and 72 are identical and comprise generally rectangular top and bottom panels 74 and 76. The top and bottom panels 74 and 76 have partial side and bottom walls which mate in the final configuration to form a box-like structure shown in FIG. 3B. Note that the jacket halves 70, 72 are welded together as at 78. The parts are provided with complementary buttons 80 and round locating holes 82 and enlarged obround locating holes 83 to position the jacket parts properly when performing the final weldment. The open end of the jacket J has upwardly and downwardly projecting ears 84 and 86 which project forwardly of the front edge of the jacket J and are staggered relative to one another for a purpose to be described.

Consider now use of a battery rack assembly 10 of the present invention. Batteries B are inserted into the jackets J, which happens at the battery manufacturing plant prior to charging and bulging.

Figure 4B:
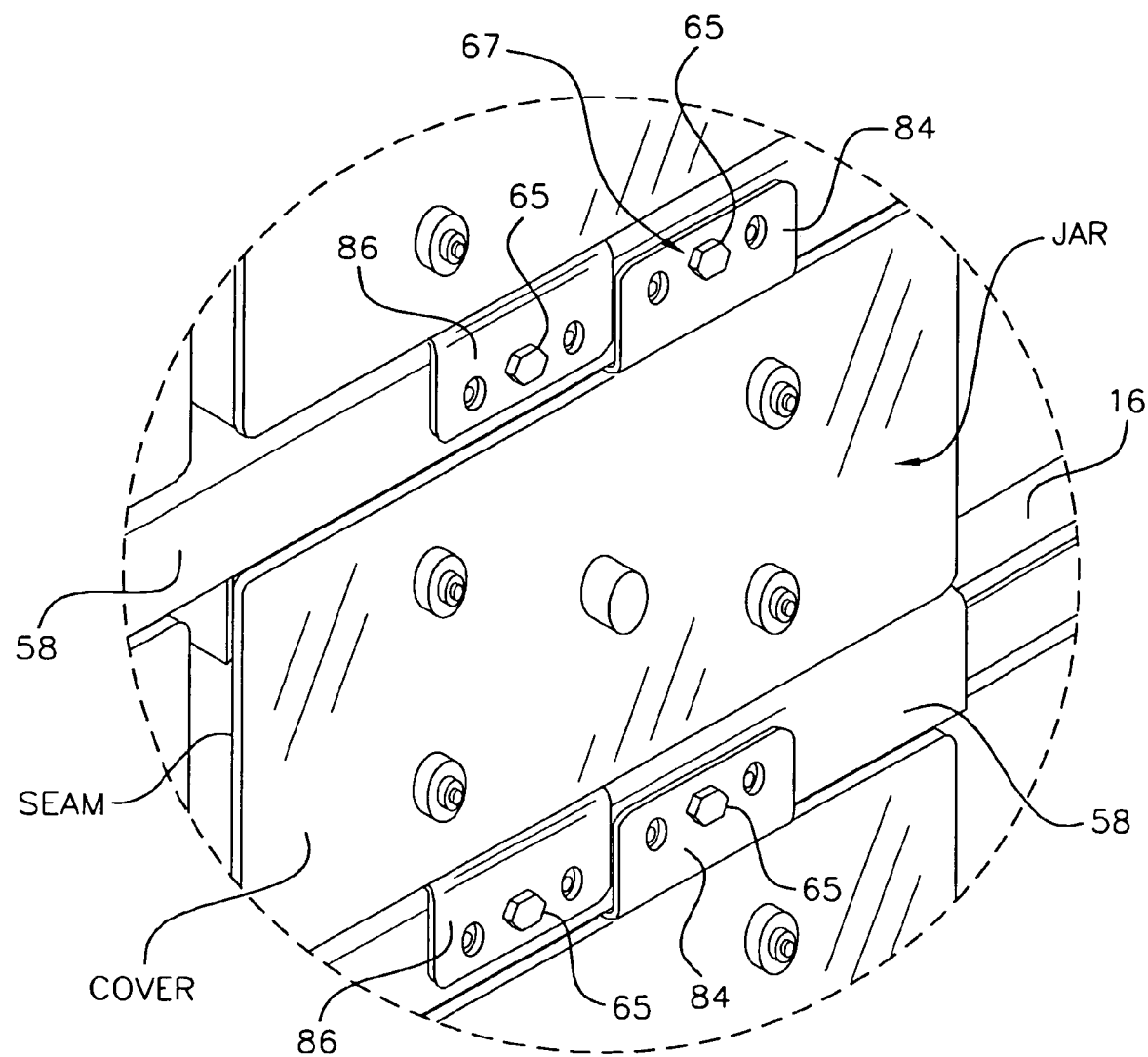
FIG. 4B is an enlarged view of the circled portion of FIG. 4D showing the jacket ears for securing the jacket to the shelves.

The jackets J, including batteries B, are loaded into the compartments defined by the shelves 18 and the shelf support channels 16 as shown in FIG. 4. Note that in this position the ears 84 and 86 of the adjacent jackets J are in side-by-side array by reason of the staggered configuration of the ears 84 and 86. The jackets J are secured to the shelves 18 and the shelf support channels 16 by means of bolts 65 extending through the center hole 67 of the three-hole array in the jacket ears 84 and 86.

Figure 6:
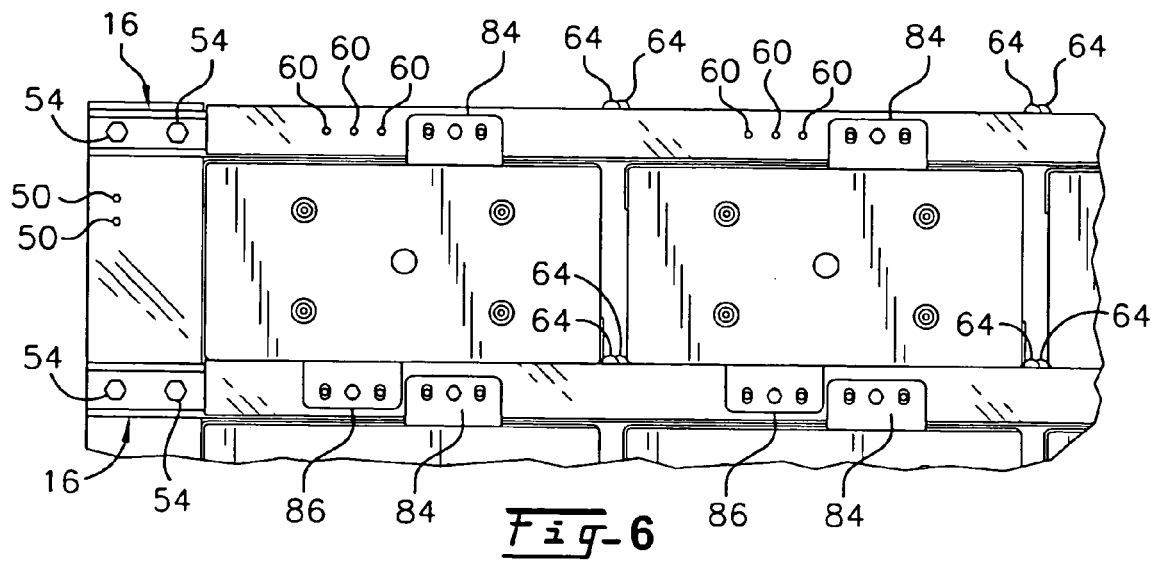
FIG. 6 is a fragmentary front view showing the dimples for separating the adjacent rows of batteries and jackets, which are also shown in FIGS. 2C and 2D.
Figure 7:
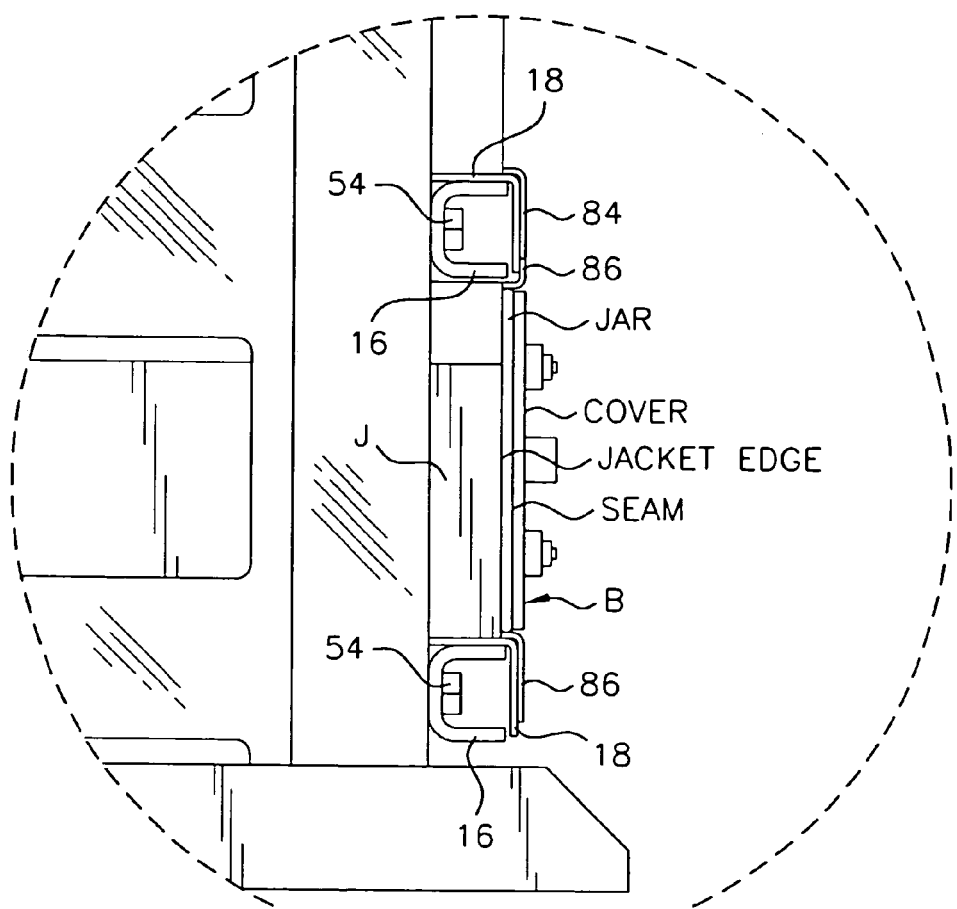
FIG. 7 is an enlarged view along lines 7—7 of FIG. 4A showing the battery held in place in the jacket and the rack assembly before the retainer bars are in place.
Figure 8B:
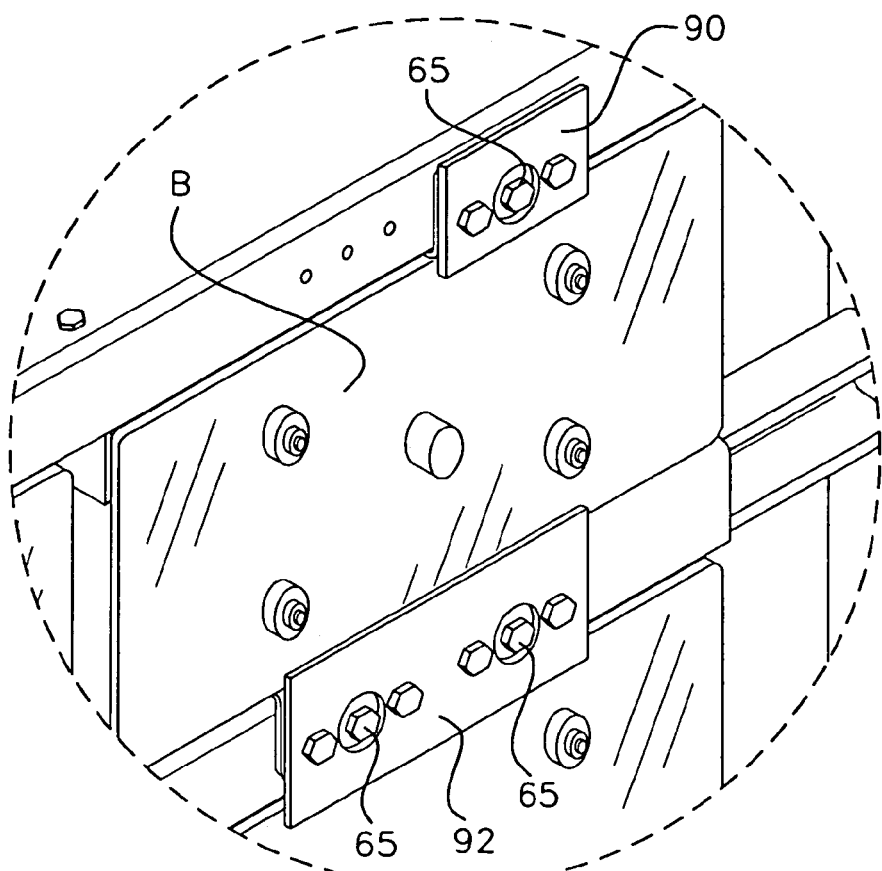
FIG. 8B is an enlarged view showing the bolted joints between a large and small retainer and a shelf.
Figure 9:
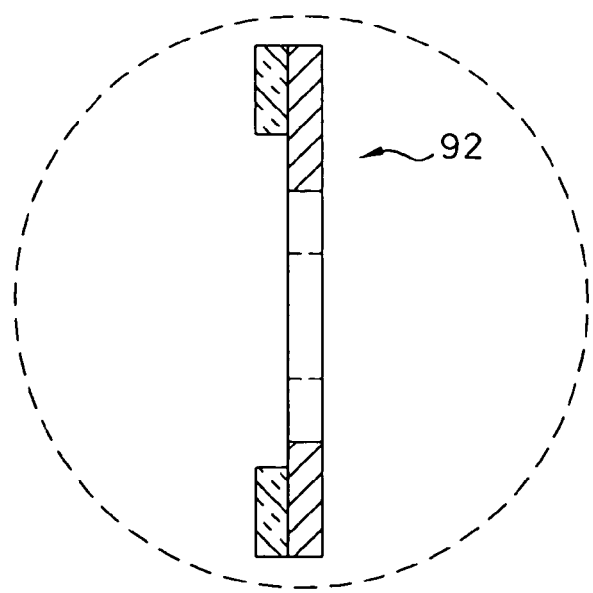
FIG. 9 is an enlarged sectional view showing taken on line 9—9 of FIG. 8 showing the retainer bar and compression strips.
Figure 10A:
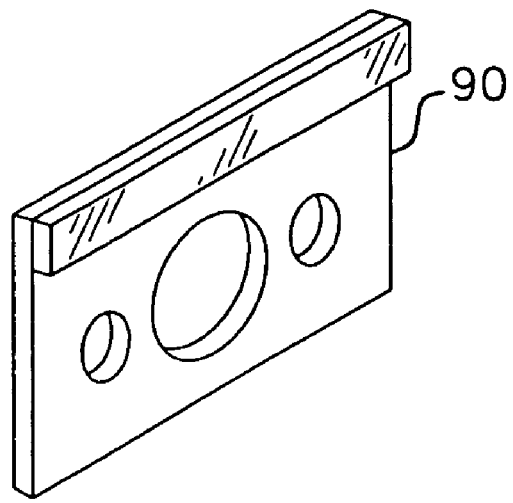
FIG. 10A is a perspective view of a retainer bar.
Figure 10B:
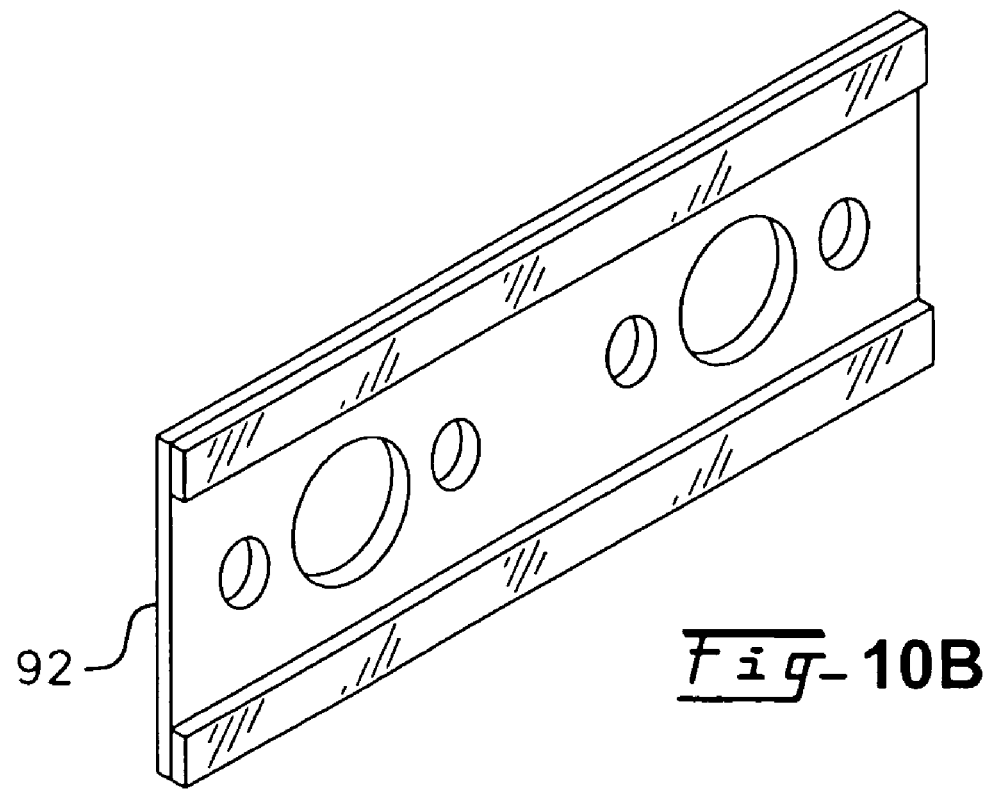
FIG. 10B is a perspective view of a large retainer bar.
Figure 11B:
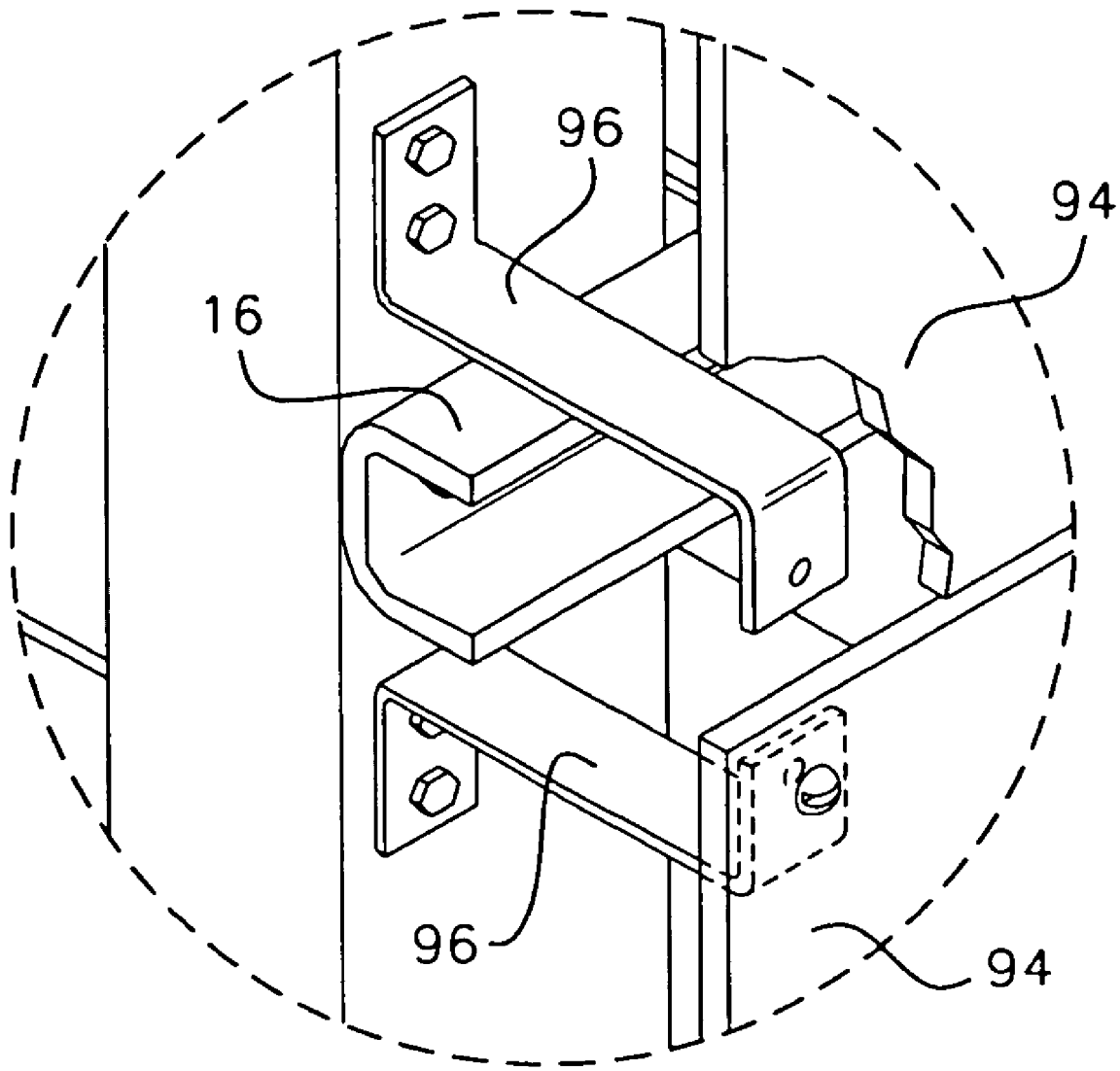
FIG. 11B is an enlarged view of the portion circled in FIG. 11A marked 11B showing the shield mounted bracket.

It is noted that when the battery B bottoms in the jacket J, the seam S at the juncture of the cover C and jar J is located forward of the front edge $E_f$ of the jacket defining the opening therein to thereby prevent damage to the seam S during insertion. Further, it is noted that the ears 84 and 86 project forwardly to allow assembly of the flat battery retainer bars 90 and 92. As shown in FIG. 6, jackets J are guided into the zones or rows $Z_1$, $Z_2$ and $Z_3$ defined by the dimples 64 so that they are spaced apart and create air ventilating channels 62 for enhancing battery performance. It also aligns the bolt openings in the ears 84 and 86 with the corresponding holes 60 in the front flange 58 of the shelf 18. The batteries B are then fixed in place in the rack by means of retainer bars 90 and 92. The retainer bar 90 has two bolt hole openings (not shown) and an enlarged central opening 55 which circumscribes/overlies the bolt heads 65 securing the jacket J to the rack 10 and is used on the lowermost and uppermost jacket to secure the battery in place in the upper and lowermost rows. The battery retainer bar 92 is elongated and has two sets of three openings 100, 101 and 102 for use in the intermediate rows in the manner shown in FIG. 8. Note, the retaining bars 90 and 92 seating or securing the batteries in the uppermost and lowermost rows, the openings arc offset to one side so that the lower portion of the retaining ring overlaps the cover of the battery in the manner shown in FIG. 8A. The bars 90 and 92 are provided with elongated strips extending along top and bottom edges to provide a cushion effect when securing the retaining bars in place. The openings in the longer bars 92 are centrally located to the bar to provide the same overlap with the cover in adjacent rows in the manner shown in FIG. 8B.

In some instances, a shield 94 overlying the front of the rack is used to further protect the batteries and to protect persons from the batteries' exposed, live connectors. The shield 94 in the present instance comprises of two generally rectangular, clear plastic sections which are supported over the front face of the rack by S-shaped brackets 96 secured to the vertical columns 22, 24, 24a of the frame members 12 and 14. The plastic sheets 94 are provided with key-hole slots 98 at their corners for cooperative engagement with headed fastening elements 99 carried by the outer end of the brackets 96.

Even though particular embodiments of the present invention have been illustrated and described herein, it is not intended to limit the invention and changes and modifications may be made therein within the scope of the following claims.

What is claimed is:

1. A frame device for supporting batteries during seismic stress, comprising:
   a pair of end frame members mounted in upstanding spaced apart relation by a plurality of vertically spaced elongated channel support members secured at opposite terminal ends to of the end frame members;
   shelves for supporting batteries spanning the channel support members and defining a plurality of compartments for the batteries;
   each end frame member being formed of a single sheet material shaped ta define vertical frame members and a web extending between the end frame members;

a pair of anchors;

means for securing the end frame members to the anchors; and means defining a plurality of openings in the web of each end frame member generally aligned with the compartments formed by the shelves to provide ventilation of batteries mounted in the compartments.

2. A frame device for supporting batteries during seismic stress, comprising:

a pair of end frame members mounted in upstanding spaced apart relation by a plurality of vertically spaced elongated channel support members secured at opposite terminal ends of the end frame members;

shelves for supporting batteries spanning the channel support members and defining a plurality of compartments for the batteries each shelf having a depending flange with bolt holes;

each end frame member being formed of a single sheet material shaped to define vertical columns and a web extending between the end frame members;

a pair of anchors;

means for securing the end frames members to the anchors;

means defining a plurality of openings in the web of each end frame member generally aligned with the compartments formed by the shelves to provide ventilation of batteries mounted in the compartments; and a jacket for housing batteries in compartments of a rack comprising identical top and bottom half portions each formed from a single piece of sheet material secured together to form a box structure open at one end and having top and bottom panels, side panels and a base panel formed integrally with the top and bottom panels to define a jacket base, lugs projecting from said top and bottom panels and extending generally transversely thereto, said lugs overlying said depending flange of shelf and secured there to by bolt fasteners engaging in said bolt holes said lugs being offset from a vertical centerline of the jacket in opposing directions at a predetermined uniform distance such that the edges of the lugs furthest from the vertical centerline of the jacket remain a constant distance from the vertical centerline of the jacket, the vertical centerline of each lug remaining a constant distance from the vertical centerline of the jacket, said lugs positioned relative bone another whereby the top and bottom lugs of adjacent jackets are in side by side relation when adjacent jackets are secured to the rack to provide a compact stacking arrangement and where adjacent jackets can be removed independently, the lugs being of a predetermined uniform width wise dimension so that the width of two adjacent lugs is adapted to be smaller than the width of a battery, said lugs being generally L-shaped and extending forwardly a predetermined distance from a transverse plane through the open front edge of the jacket to expose the seam of a battery and permit torquing fasteners engaging through the lugs to secure the jacket to the rack without damaging the battery.

3. A frame device for supporting batteries during seismic, comprising:

a pair of end frame members mounted in upstanding spaced apart relation by a plurality of vertically spaced elongated channel support members secured at opposite terminal ends the end frame members;

shelves for supporting batteries spanning the channel support members and defining a plurality of compartments for the batteries, each shelf having a flange with bolt holes;

each end frame member being formed of a single sheet material shaped to define vertical columns and a web extending between the end frame members;

a pair of anchors;

means for securing the end frame members to the anchors;

means defining a plurality of openings in the web of each end frame member generally aligned with the compartments formed by the shelves to provide ventilation of batteries mounted in the compartments; and a jacket for housing batteries in compartments of a rack comprising top and bottom half portions formed from a single piece of sheet material which are identical, each said portion comprising generally rectangular top and bottom panels having partial side walls which complement one another and are secured together by weldments to form opposing side walls and a box structure open at one end and closed at its apposite end, the jacket having upwardly and downwardly projecting lugs extending forwardly from the front edge of the top and bottom panels of the jacket, said lugs overlying said depending flange of a shelf and secured thereto by bolt fasteners engaging in said bolt holes, said lugs being staggered relative to one another whereby the top and bottom lugs of adjacent jackets are in side by side relation when the adjacent jackets are secured to the rack, the lugs being of a predetermined uniform widthwise dimension so that the width of two adjacent lugs is smaller than the width of a battery.

4. A frame device for supporting batteries during seismic stress, comprising:

a pair of end frame members mounted in upstanding spaced apart relation by a plurality of vertically spaced elongated channel support members secured at opposite terminal ends of the end frame members;

shelves for supporting batteries spanning the channel support members and defining a plurality of compartments for the batteries;

each end frame member being formed of a single sheet material shaped to define vertical columns and a web extending between the and frame members;

a pair of anchors;

means for securing the end frame members to the anchors;

means defining a plurality of openings in the web of each end frame member generally aligned with the compartments formed by the shelves to provide ventilation of batteries mounted in the compartments; and a jacket for housing batteries in compartments of a rack comprising top and bottom half portions which are identical, each said portion formed from a single piece of sheet material and shaped to define generally rectangular top and bottom panels having partial side walls which complement one another and base walls formed integrally with panels of the half portions and define a jacket base when the half portions are secured together by weldment to form a box structure having an open end and a base, lugs formed integrally with at least one of said panels adjacent the open end for securing the jacket to the rack.

5. A frame device for supporting batteries during seismic stress, comprising:

a pair of end frame members mounted in upstanding spaced apart relation by a plurality of vertically spaced elongated channel support members secured at opposite terminal ends of the end frame members;

shelves for supporting batteries spanning the channel support members and defining a plurality of compartments for the batteries;

each end frame member being formed of a single sheet material shaped to define vertical frame members and a web extending between the end frame members;

a pair of anchors;

means for securing the end frame members to the anchors;

means defining a plurality of openings in the web of each end frame generally aligned with the compartments formed by the shelves to provide ventilation of batteries mounted in the compartments; and a jacket for housing batteries in compartments of a rack comprising top and bottom half portions formed from a single piece of sheet material which are identical, each said portion comprising generally rectangular top and bottom panels having partial side walls which complement one another and are secured together by weldments to form opposite side walls and a box structure open at one end and closed at its opposite end, the jacket having upwardly and downwardly projecting lugs extending forwardly a predetermined distance from the front edge of the top and bottom panels of the jacket to expose the seam of a battery mounted in a jacket secured to the rack by the lugs.

* * * * *